United States Patent
Conley (10) Patent No.: US 10,852,705 B1
(45) Date of Patent: Dec. 1, 2020

(54) DISTRIBUTED ELECTRICAL POWER MANAGEMENT SYSTEM

(71) Applicant: AMAZON TECHNOLOGIES, INC., Seattle, WA (US)

(72) Inventor: Myles Conley, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 16/198,625

(22) Filed: Nov. 21, 2018

(51) Int. Cl.
*G05B 19/042* (2006.01)
*G06F 1/3234* (2019.01)

(52) U.S. Cl.
CPC ......... *G05B 19/042* (2013.01); *G06F 1/3234* (2013.01); *G05B 2219/2639* (2013.01)

(58) Field of Classification Search
None
See application file for complete search history.

(56) References Cited

U.S. PATENT DOCUMENTS

| | | | | |
|---|---|---|---|---|
| 8,639,391 B1 * | 1/2014 | Alberth, Jr. | ............ | G05B 15/02 340/657 |
| 2011/0221348 A1 * | 9/2011 | Kwag | .................. | H05B 47/155 315/130 |
| 2013/0227126 A1 * | 8/2013 | Imes | .................... | H02J 13/0079 709/224 |
| 2013/0234625 A1 * | 9/2013 | Kondo | .................... | H05B 47/12 315/313 |
| 2013/0234840 A1 * | 9/2013 | Trundle | .................... | F24F 11/30 340/12.53 |
| 2013/0238140 A1 * | 9/2013 | Malchiondo | ........ | H04L 12/2807 700/276 |
| 2015/0180976 A1 * | 6/2015 | Xiao | ........................ | H04L 67/12 709/203 |
| 2015/0185751 A1 * | 7/2015 | Karc | ....................... | H05B 47/19 700/295 |
| 2015/0185752 A1 * | 7/2015 | Bard | ......................... | G05F 1/66 700/296 |
| 2015/0212532 A1 * | 7/2015 | Hsu | ........................ | G05B 15/02 700/14 |

* cited by examiner

Primary Examiner — Jason Lin
(74) Attorney, Agent, or Firm — Lindauer Law, PLLC (57) ABSTRACT

Devices in an environment may be transitioned to a low power state based on calendar data or other types of user input. User input indicating a first device, a time period, and a set of conditions is received. When the time period occurs, device data from one or more devices in the environment is used to determine whether the set of conditions is met. If the conditions are met, an instruction from a device outside of the environment is provided to the first device to cause the first device to enter a low power state, during which the device is no longer accessible to other devices outside of the environment. After a lapse of the time period, a change in conditions, or in response to manual input provided to the first device, the first device returns to an operational state.

20 Claims, 7 Drawing Sheets

DISTRIBUTED ELECTRICAL POWER MANAGEMENT SYSTEM

BACKGROUND

Computing devices and other types of devices in a home, business, or other environment may consume electrical power, even during times when the devices are dormant or inactive. However, deactivating a device to conserve power renders the device unavailable for use by a user.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

Homes, businesses, and other types of environments may include various electrically-powered devices, such as computing devices, home entertainment devices, lights, appliances, climate control units, security systems, and so forth. Each of these devices consumes electrical power when in use. Even when a device is not in use by a user, the device may still consume electrical power while waiting to receive user input or control. For example, a networked speaker device may consume a first quantity of electrical power when outputting audio or receiving audio input and a second, smaller quantity of electrical power when not receiving input or generating output, but maintaining a microphone in an active state to receive user input. Deactivating a device may conserve additional electrical power, but at the cost of leaving the device unavailable for use until reactivated.

Described in this disclosure are techniques for automatically placing devices in an environment into low power states. When in a low power state, a device may be inaccessible to other devices outside of the environment. For example, a device within a home or business that is transitioned to a low power state may no longer maintain a communication link with a wireless access point to exchange data with devices outside of the home or business. The times that a device enters a low power state may be based on user-customized times and sets of conditions. For example, a user may access a user interface to provide user input for one or more devices in an environment. In some cases, a device may be in networked communication with other devices outside of the home, business, or other type of environment, such as by communication using a wireless access point. In other cases, a device may not communicate with devices outside of the environment, but may still communicate with devices within the environment, such as via a local network or wired connection.

User input received via the user interface may indicate a particular device, a time period during which the device may be transitioned to a low power state, and a set of conditions for causing the device to enter the low power state. For example, a user may provide user input indicating that all networked speaker devices in a home are to enter a low power state between the hours of 8:00 A.M. and 6:00 P.M. while the user is away from the home at work. The user may also provide user input indicating that all networked speaker devices except for a single device located in the user's bedroom are to enter a low power state between the hours of 9:00 P.M. and 6:00 A.M. while the user is asleep. The user input may also indicate one or more conditions for the device to enter the low power state. For example, the user input may specify that a device is not currently in use or has not been used for a threshold length of time prior to entering the low power state. As another example, the user input may specify that a threshold count of users is not within proximity of a device prior to causing the device to enter the low power state. As yet another example, the user input may specify a quantity of electrical power, a value of a unit of electrical power, weather data, or an event associated with provision of electrical power to a device. Continuing the example, weather data may include an outdoor temperature of greater than 95 degrees Fahrenheit, during which electrical power use by an air conditioner would be expected to increase. During such a time, other devices in a home may be transitioned to a low power state to reduce the overall electrical power used by the home.

Upon occurrence of an indicated time period, device data from one or more devices in the environment may be used to determine a current set of conditions. If the current set of conditions corresponds to the conditions indicated in the user input, the device indicated in the user input may be transitioned to a low power state. Transitioning a device to a low power state may include providing a command (e.g., an instruction) to the device that causes the device to become inaccessible to devices outside of the environment. For example, a networked device may cease being active to receive user input and may instead activate a low power microcontroller to determine a length of time that has lapsed. In some implementations, a device in a low power state may be caused to enter an operational state periodically, such as once every thirty minutes, to determine that additional user input changing the time period or conditions has not been received, or the current set of conditions has not changed, after which the device may return to the low power state. Additionally, in some implementations, a device may include a manual control, such as a switch or button, that may be operated to transition the device from a low power state to an operational state. If user input to manually change the state of the device or user input changing the time period or conditions is not received, the device may automatically resume an operational state after the period of time indicated in the user input has lapsed.

In some implementations, if a first device indicated in the user input is not accessible to communications from devices outside of the environment, a second device that is in communication with the first device may be determined. For example, a personal computer may not be in communication with devices outside of an environment, but a cellular telephone that is connected to a universal serial bus (USB) port of the computer for charging or data transfer purposes may be in communication with other devices. In such a case, data may be provided to the second device to cause a command to be provided to the first device that causes the first device to enter a low power state. In some implementations, groups of devices may be transitioned to a low power state in this manner. For example, user input may be used to indicate a particular device in an environment, as well as a group of other devices controlled by the particular device, that are to be transitioned to a low power state. Continuing the example, a networked speaker device may be used to control one or more lights, an air conditioning unit, and a microwave oven within a home, and user input used to transition the speaker to a low power state may also cause the other devices to enter a low power state.

In some implementations, if a user provides manual input to return a particular device to an operational state, a notification indicative of the conditions that cause the device to enter the low power state, such as a quantity of electrical power used by the device or saved by retaining the device in a low power state may be generated. The notification may be provided to the particular device or to another device in the environment. In some cases, a notification maybe provided to a device outside of the environment. For example, if a user is away from the environment and an unauthorized individual within the environment attempts to transition a device to an operational state, a notification may be provided to a portable computing device associated with the user. In other implementations, notifications indicative of quantities of power that may be used or saved may be provided to a user, such as via the user interface, to suggest particular devices that may be transitioned to a low power state to conserve electrical power. For example, a notification may be provided to a device outside of the environment, such as a portable computing device carried by a user, and user input may be provided to the portable computing device to confirm a time period or condition for transitioning a device to a low power state. In some cases, machine learning may be used to determine use patterns for devices based on historical use of the devices at particular dates and times. For example, machine learning may be used to determine overall use of electrical power, fluctuations in the cost of electrical power at different dates and times, events associated with the provision of electrical power, such as brown-outs or weather events, and so forth, which may be indicated in the notifications provided to the user.

As one skilled in the art will appreciate in light of this disclosure, certain embodiments may be capable of achieving certain advantages, including some or all of the following: enabling a user to customize the automatic transitioning of devices into low power states by generating calendar data indicative of time periods and conditions for which each device may conserve electrical power and computational resources. Additionally, providing a single user interface that enables control of all devices in an environment, including devices that may not be accessible via a network through use of other devices in the environment, may provide a simplified method for control of the power state of each device. Use of quantities of electrical power, or in some cases, the value of a unit of electrical power as a condition for controlling the power state of various devices may enable users to be provided with notifications or recommendations that indicate power savings, environmental benefits, cost savings, or in some cases, financial incentives. For example, a party that provides the user interface, notifications, recommendations, or devices to a user may incentivize the user to elect particular power states through offers of remuneration. Additionally, in cases where power savings by individual users may not be significant, use of low power states by a large number of users that associate with a party that provides user interfaces, notifications, recommendations, or devices to users may enable a large quantity of aggregate power or cost savings to be generated.

Figure 1:
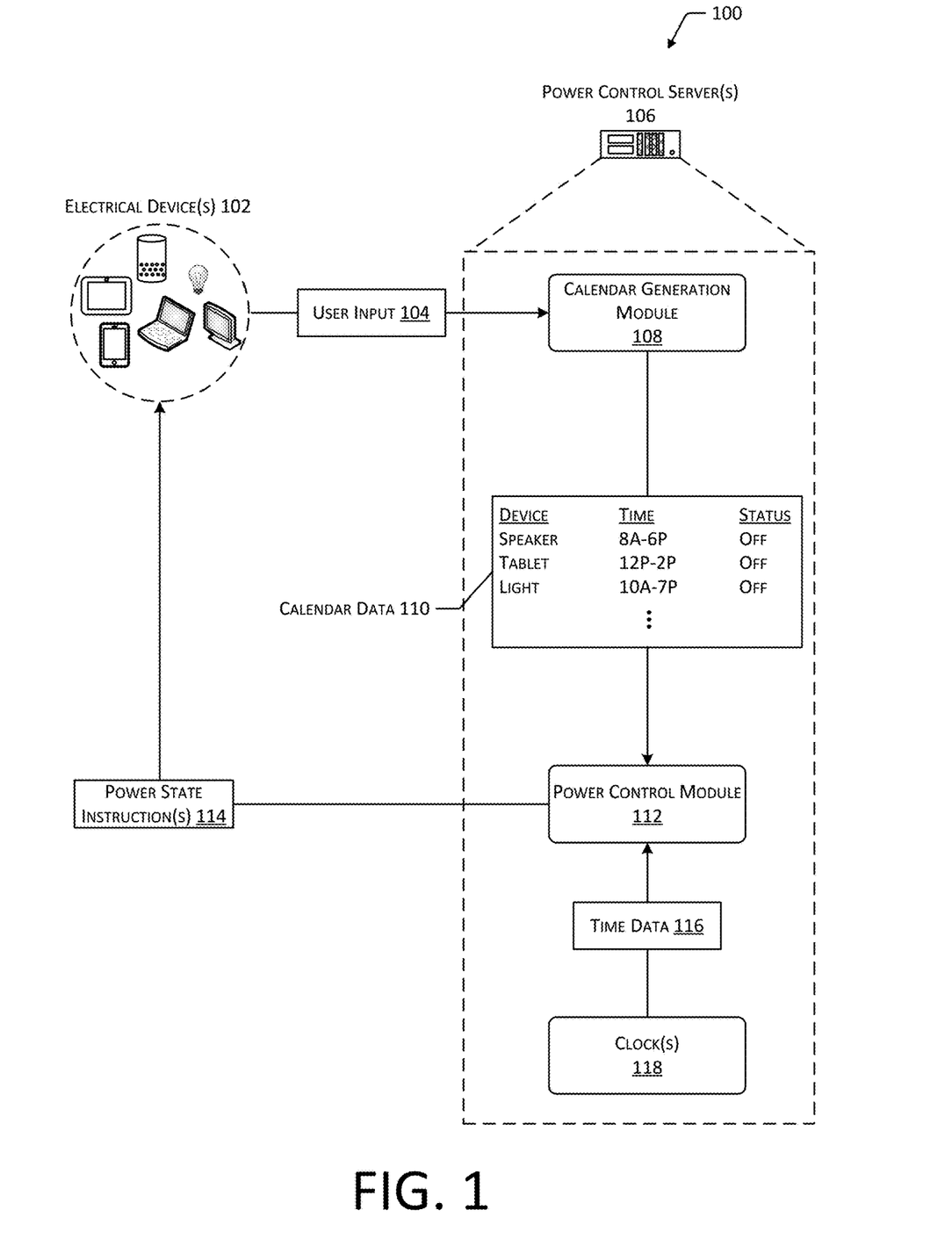
FIG. 1 depicts an implementation of a system for controlling the power state of one or more electrical devices in an environment based on user input.

FIG. 1 depicts an implementation of a system 100 for controlling the power state of one or more electrical devices 102 in an environment based on user input 104. An environment may include a home, business, or other type of structure or group of structures. Multiple electrical devices 102 may be placed at various locations within an environment and may communicate with one another or with one or more other devices outside of the environment. For example, some electrical devices 102 may include computing devices, such as networked speaker devices, personal computers, portable computing devices such as smartphones or tablet computers, wearable computing devices, automotive computing devices, set-top boxes, networked remote controllers or game controllers, and so forth. Other electrical devices 102 may include non-computing devices (e.g., devices that lack one or more of processors or memory), such as appliances or utility devices. For example, electrical devices 102 may include lights, climate control units such as air conditioners, appliances such as microwave ovens, security devices such as lights or motion sensors, and so forth. In some cases, appliances or utility devices may include computing devices. For example, a microwave oven may include a wireless controller to enable remote control or programming of the device, an air conditioner may include a programmable thermostat, a security system may include a programmable control panel, and so forth. Some electrical devices 102 may be in communication with devices outside of the environment, such as via a wireless or wired connection to an access point. Other electrical devices 102 may not be configured for communication with devices outside of the environment, but may communicate with one or more devices within the environment, such as via a wired connection, a local network, near field communication, and so forth.

Each electrical device 102 may be in a particular power state at a given time, and the quantity of electrical power used by an electrical device 102 may vary based on the type or characteristics of the device and its current power state. For example, a smart television that is actively streaming video content may consume a larger quantity of electrical power than a smart television that is active to receive content but not currently receiving content for streaming. Similarly, other electrical devices 102 that are inactive use may consume a greater quantity of electrical power than electrical devices 102 that are maintained in a state that is available for use while not actively being used. However, maintaining an electrical device 102 in a state that is available for use may still consume electrical power, which may not be necessary during times that a user does not intend to use a particular device or during times when power conservation may be especially beneficial, such as during brown-outs, periods of high power cost, or certain weather conditions. In such a case, a user may wish to cause one or more electrical devices 102 to enter a low power state, during which an electrical device 102 is not available for use until removed from the low power state. For example, a networked speaker device that is available for use may continue to consume power in a ready state while maintaining an active microphone for receiving user input. However, if the networked speaker device is transitioned to a low power state, the speaker device may no longer be available to receive user input until removed from the low power state. In some implementations, a device that is in a low power state may no longer receive signals from other devices. For example, a device in a low power state may remain in the low power state until expiration of a time period or occurrence of a condition, determined by the device, or until the device receives manual input from a user.

The power state of one or more electrical devices 102 may be controlled based on user input 104. For example, a user may provide user input 104, using one or more of the electrical devices 102 in the environment or another computing device, to one or more power control servers 106. The user input 104 may include an indication of an electrical device 102, a time period during which the electrical device 102 may be transitioned to a low power state, and in some cases, one or more conditions during which the electrical device 102 may be transitioned to the low power state. For example, user input 104 may indicate that a networked speaker device is to be transitioned to a low power state between the hours of 8:00 A.M. and 6:00 P.M. if the outdoor temperature is greater than 95 degrees Fahrenheit, no user is detected within proximity of the speaker device, or the price for a unit of electrical power exceeds a threshold amount. In some implementations, the power control server(s) 106 may provide a user interface to an electrical device 102 or another computing device.

The user interface may be configured to receive user input 104 identifying particular electrical devices 102, time periods, and conditions. For example, a user interface may include fields that correspond to this information, may be prepopulated with a list of electrical devices 102 detected in the environment, may include menus or lists to facilitate selection of time periods or conditions, and so forth. In some implementations, a user interface may include recommendations based on historical use patterns of one or more electrical devices 102. In some cases, recommendations may be based on the time periods or conditions received for other electrical devices 102. For example, if a new electrical device 102 accesses the system 100, time periods, conditions, or both, during which the new electrical device 102 is to transition to a low power state may be automatically configured based on the existing time periods and conditions associated with other electrical devices 102. In other implementations, the time periods and conditions associated with other electrical devices 102 may be output as recommendations and used to configure a new electrical device 102 based on user input confirming the recommendation. The time periods or conditions included in a recommendation for a new electrical device 102 may include time periods or conditions associated with all or a threshold portion of the other electrical devices 102 within the environment.

The power control server(s) 106 may include one or more servers or any other types of computing devices, including, without limitation, the types of computing devices described with regard to the electrical devices 102. In other implementations, one or more of the functions described with regard to the power control server(s) 106 may be performed by one of the electrical devices 102, and use of the power control server(s) 106 or another computing device external to the environment may be omitted. A calendar generation module 108 associated with the power control server(s) 106 may generate calendar data 110 based on the user input 104. Calendar data 110 may indicate particular dates and times for one or more electrical devices 102 and corresponding power states for the particular dates and times. In some implementations, calendar data 110 may also indicate one or more conditions associated with a power state.

A power control module 112 associated with the power control server(s) 106 may generate one or more power state instructions 114 for changing the power state of one or more electrical devices 102. For example, the power control module 112 may determine time data 116 from one or more clocks 118 or other modules associated with the power control server(s) 106 or another computing device. Based on correspondence between the time data 116 and the calendar data 110, occurrence of a time period indicated in the calendar data 110 may be determined. In some implementations, the power control module 112 may also determine device data from one or more electrical devices 102, or other data indicative of current conditions associated with the environment, the electrical devices 102, or the provision of electrical power. In such a case, the power control module 112 may also determine correspondence between the data indicative of the current conditions and the conditions indicated in the calendar data 110 to determine occurrence of one or more conditions under which the power state of an electrical device 102 is to be changed. For example, in response to time data 116 indicating occurrence of a time indicated in the calendar data 110 and in some cases, device data or other condition data indicating occurrence of a condition indicated in the calendar data 110, the power control module 112 may generate a power state instruction 114 to cause an electrical device 102 to enter a low power state. In some implementations, if an electrical device 102 is not in communication with the power control server(s) 106, the power control module 112 may provide a power state instruction 114 to another device in communication with the electrical device 102. For example, a computing device that communicates with an electrical device 102 via a wired connection, local network, near field communication, and so forth may receive the power state instruction 114 and cause the electrical device 102 to enter the low power state.

Figure 2:
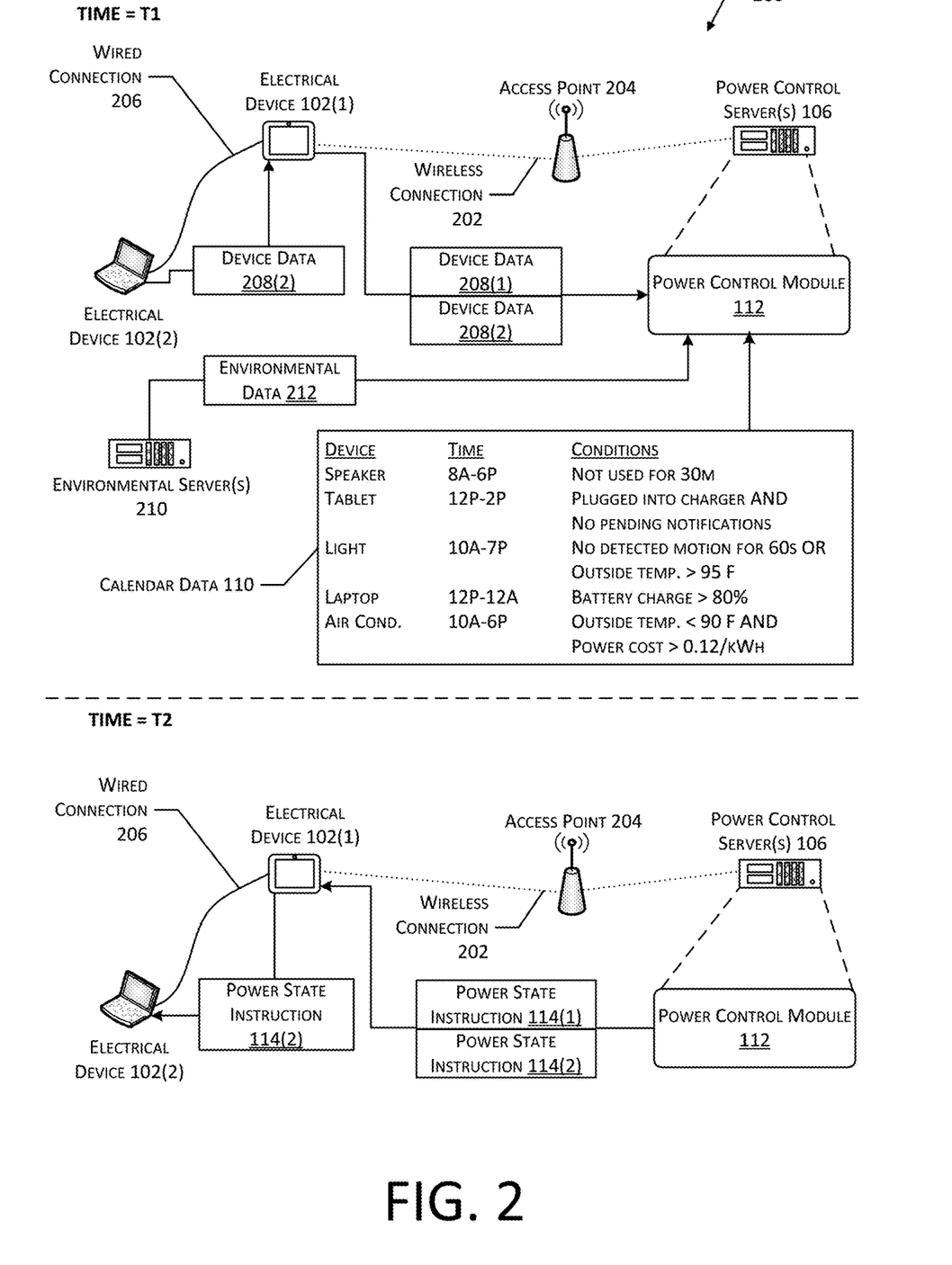
FIG. 2 depicts an implementation of a system for controlling the power states of multiple electrical devices in an environment, including one or more electrical devices not accessible to devices outside of the environment.

FIG. 2 depicts an implementation of a system 200 for controlling the power states of multiple electrical devices 102 in an environment, including one or more electrical devices 102 not accessible to devices outside of the environment. As described with regard to FIG. 1, one or more power control servers 106 may provide power state instructions 114 to electrical devices 102 to cause the electrical devices 102 to enter a low power state if the time periods and conditions indicated in calendar data 110 are met. In some cases, the power control server(s) 106 may communicate directly with an electrical device 102. For example, FIG. 2 depicts a first electrical device 102(1) in communication with the power control server(s) 106 using a wireless connection 202 via a wireless access point 204. In other cases, an electrical device 102 may not be in direct communication with the power control server(s) 106. For example, FIG. 2 depicts a second electrical device 102(2) that is not in communication with the access point 204. However, in some implementations, data may be determined from an electrical device 102(2) and commands may be provided to the electrical device 102(2) by communicating using another electrical device 102 in the environment. For example, FIG. 2 depicts the first electrical device 102(1) in communication with the second electrical device 102(2) using a wired connection 206. In other implementations, multiple electrical devices 102 in an environment may communicate using local networks, near field communication, wired connections 206, or any combination of these methods.

FIG. 2 depicts example calendar data 110 indicative of five electrical devices 102, including the first electrical device 102(1) (e.g., "Tablet") and the second electrical device 102(2) (e.g., "Laptop"). The calendar data 110 associates a time period with each electrical device 102, the time period indicating times when the electrical device 102 may be transitioned to a low power state. For example, the time periods may be determined based on user input 104 indicative of times when a user does not intend to use particular electrical devices 102. In other implementations, the time periods may include default time periods. In still other implementations, the time periods may include automatically-generated time periods based on historical use patterns of the corresponding electrical devices 102, such as by using machine learning techniques to determine the time periods when an electrical device 102 is least likely to be used. In some cases, time periods determined based on analysis of historical use patterns of an electrical device 102 may be provided, such as via a user interface, as a recommendation. The calendar data 110 is also shown indicating one or more conditions for each electrical device 102. For example, if occurrence of a time period is determined, data indicative of a current set of conditions may also be determined. If the current conditions match the conditions associated with an electrical device 102, the electrical device 102 may be transitioned to a low power state. For example, the calendar data 110 may include conditions such as a period of non-use of an electrical device 102, the electrical device 102 currently being engaged with a charger or in a recharging state, a lack of pending notifications associated with the electrical device 102, a lack of detected motion proximate to the electrical device 102, a current outdoor temperature, a current state of charge for a power source of an electrical device 102, or a current cost of a unit of electrical power. In some cases, multiple conditions may be associated with an electrical device 102. The conditions may be disjunctive, such that if a single condition is satisfied, the electrical device 102 may be transitioned to a low power state, or conjunctive, such that multiple conditions associated with the electrical device 102 must be satisfied before placing the electrical device in a low power state.

A power control module 112 associated with the power control server(s) 106 may determine device data 208 indicative of one or more conditions associated with an electrical device 102. For example, device data 208 may indicate periods of use or non-use, types of activity, detected motion, a charging status, and so forth. In other implementations, data from other devices within the environment or outside of the environment may be used to determine one or more conditions. For example, one or more environmental servers 210 may be accessed to determine environmental data 212 indicative of one or more conditions. Continuing the example, the environmental server(s) 210 may include computing devices associated with providers or distributors of electrical power, weather stations, or other devices having sensors suitable for determining conditions associated with weather or the provision of electrical power. Continuing the example, environmental data 212 may include weather data indicating a current or future temperature or a weather event. Environmental data 212 may also include power data, which may be accessed to determine costs or quantities of electrical power used by particular electrical devices 102, accounts, users, and so forth. Because the second electrical device 102(2) is not in communication with the access point 204, device data 208(2) associated with the second electrical device 102(2) may be provided to the first electrical device 102(1). The first electrical device 102(1) may provide first device data 208(1) indicative of conditions associated with the first electrical device 102(1) as well as the second device data 208(2) to the power control server(s) 106. In other implementations, other electrical devices 102 within an environment may provide device data 208 indicative of conditions within an environment. For example, an electrical device 102 other than the first electrical device 102(1) or second electrical device 102(2) may be used to determine motion within the environment, proximity of one or more users to one or more of the electrical devices 102, use of electrical devices 102, location of electrical devices 102, or other conditions.

As described with regard to FIG. 1, based on correspondence between the device data 208 or other data indicative of conditions and the calendar data 110, the power control module 112 may generate one or more power state instructions 114 for causing one or more electrical devices 102 to enter a low power state. Because the second electrical device 102(2) is not in communication with the access point 204, a first power state instruction 114(1) for the first electrical device 102(1) and a second power state instruction 114(2) for the second electrical device 102(2) may both be provided to the first electrical device 102(1). The first electrical device 102(1) may then provide the second power state instruction 114(2) to the second electrical device 102(2) via the wired connection 206. The power state instructions 114(2) may be either explicitly addressed to the second electrical device 102(2), or may be provided by the first electrical device 102(1) to the second electrical device 102(2) as a result of the wired connection 206 between the two. In some implementations, multiple electrical devices 102 that communicate with one another or that control other electrical devices 102 may be transitioned to a low power state 102 as a group. In other implementations, individual electrical devices 102 may be transitioned to a low power state independent of the relationships between electrical devices 102.

In some implementations, a third electrical device 102(3) (not shown) may announce on the network its presence. A previously configured electrical device 102 may provide power state instructions 114 to the third electrical device 102(3). For example, the third electrical device 102(3) may be newly installed or have been recently restored to default settings. The third electrical device 102(3) may send a broadcast packet that is received and processed by the first electrical device 102(1). The first electrical device 102(1) may send the third electrical device 102(3) a power state instruction 114 that directs the third electrical device 102(3) to transition to a low power state. For example, if the other electrical devices 102 in the environment are in the low power state, the newly installed electrical device 102 may transition to the low power state as well. In some implementations the first electrical device 102(1) may provide other information, such as network configuration settings, account configuration credentials, and so forth to facilitate configuration.

Operation of the electrical device 102 may be determined based on whether the device has been registered with the power control server 106 or another server. For example, the newly installed electrical device 102 may remain in a low power mode until it has been registered with the power control server 106.

Figure 3:
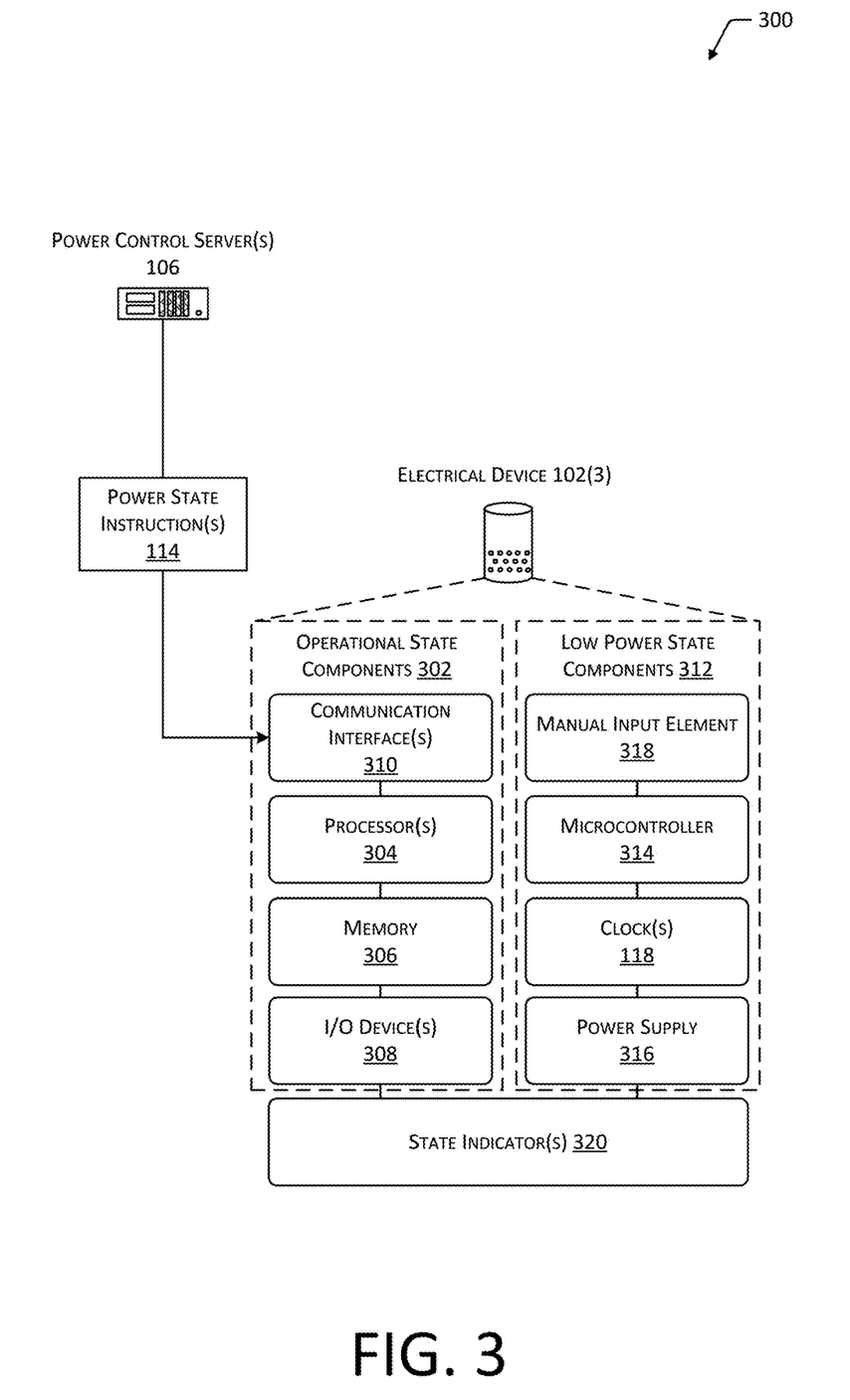
FIG. 3 is a block diagram depicting an implementation of an electrical device within the present disclosure.

FIG. 3 is a block diagram 300 depicting an implementation of an electrical device 102(3) within the present disclosure. Specifically, FIG. 3 depicts an example electrical device 102(3) as a networked speaker device configured to receive audio input using a microphone and provide audio output using a speaker. In some implementations, such an electrical device 102(3) may be in wired or wireless communication with one or more other electrical devices 102 and may be used to control such electrical devices 102. For example, audio input provided to a networked speaker device may be used to control the illumination provided by one or more lights, the temperature associated with a climate control unit, the content presented by a video device, and so forth. The electrical device 102(3) may include a series of operational state components 302 that are used when the electrical device 102(3) is in an operational state, such as when the electrical device 102(3) is receiving input, generating output, or maintaining an input device in a state that is prepared to receive input.

For example, the operational state components 302 may include one or more processors 304 that execute stored instructions. The processor(s) 304 may include one or more cores. Instructions and other data may be stored in memory 306, which may include any manner of computer-readable storage media (CRSM). For example, the CRSM may be any one or more of an electronic storage medium, a magnetic storage medium, an optical storage medium, a quantum storage medium, a mechanical computer storage medium, and so forth. The memory 306 may provide storage of computer-readable instructions, data structures, program modules, and other data for the operation of the electrical device 102(3). While FIG. 3 depicts the electrical device 102(3) including memory 306, in other implementations, the memory 306 may include a remote data storage medium that may be accessed using one or more networks or wired connections 206. The operational state components 302 may further include one or more input or output (I/O) devices 308, such as microphones, speakers, touch sensors, keyboards, mouse devices, image sensors (e.g., cameras), scanners, displays, haptic devices, printers, and so forth. In some implementations, the I/O devices 308 may be physically incorporated with the electrical device 102(3). In other implementations, the I/O devices 308 may be externally placed. The operational state components 302 may also include one or more communication interfaces 310, such as input/output (I/O) interfaces, network interfaces, and so forth. The communication interfaces 310 may enable the electrical device 102(3) to communicate with other devices. For example, when the electrical device 102(3) is in an operational state, one or more communication interfaces 310 may function to receive power state instructions 114 from one or more power control severs 106.

When the electrical device 102(3) is in an operational state, one or more I/O devices 308 may remain active to receive input and generate output, the processor(s) 304 may execute instructions stored in the memory 306, and the communication interface(s) 310 may remain active to transmit and receive data to and from other devices. For example, a networked speaker device in an operational state may be configured to maintain a microphone in an active state to receive audio input. In response to the audio input, the communication interfaces 310 may transmit at least a portion of the audio input to one or more servers configured to process the input, or alternatively, the processors 304 and one or more modules stored in the memory 306 may process the input. Then, a response associated with the input may be generated using the processors 304 or received via the communication interfaces 310. A speaker or other output device may be used to present the response.

When the electrical device 102(3) receives a power state instruction 114 to cause the electrical device 102(3) to enter a low power state, use of the operational state components 302 may cease, and the electrical device 102(3) may begin to utilize a set of low power state components 312. For example, when the electrical device 102(3) is in a low power state, the communication interfaces 310 may no longer transmit or receive data from other devices, the I/O devices 308 may no longer be active to receive input or generate output, and the processor(s) 304 may no longer execute instructions stored in the memory 306. Instead, when in the low power state, a microcontroller 314 that consumes a very small quantity of power from a power supply 316, such as a low capacity battery, may control operations of the electrical device 102(3). The microcontroller 314 may receive data from one or more clocks 118 indicating the passage of time. For example, the power state instruction 114 may indicate a length of time associated with the low power state, based on the time period indicated by the calendar data 110. The microcontroller 314 may use data received from the clock(s) 118 to maintain the electrical device 102(3) in the low power state until a lapse of the time period. In some implementations, the microcontroller 314 may be configured to cause the electrical device 102(3) to enter an operational state temporarily after passage of a set interval of time, such as thirty minutes. For example, while an electrical device 102(3) is in a low power state, a user may modify the calendar data 110 or one or more conditions associated with the electrical device 102(3) may have changed. Briefly returning the electrical device 102(3) to an operational state may enable the electrical device 102(3) or power control server(s) 106 to determine whether, based on the calendar data 110, the current time, and a current set of conditions, the electrical device 102(3) should be returned to the low power state or remain in the operational state.

In some implementations, the electrical device 102(3) may include a manual input element 318, such as a button, switch, or other feature that may be manipulated by a user to return the electrical device 102(3) to an operational state. For example, in addition to determining the passage of time, the microcontroller 314 may also function to receive a signal from the manual input element 318 and return the electrical device 102(3) to the operational state in response to the signal.

In some implementations, the electrical device 102(3) may include one or more state indicators 320, which may be used to indicate whether the electrical device 102(3) is currently operating within the operational state or the low power state. For example, a state indicator 320 may include a light emitting diode (LED) or other visible element positioned on the electrical device 102(3). The color, pattern, intensity, or other characteristic of the light emitted by the LED may indicate the current power state of the electrical device 102(3). For example, continuous emission of light by the LED may indicate an operational state while a slow or intermittently pulsing light may indicate a low power sate. As another example, red emitted light may indicate a low power state while green emitted light may indicate an operational state. In other cases, the state indicator 320 may include an audible output device. In some implementations, the state indicator 320 may also be used to indicate notifications or recommendations. For example, if a user actuates the manual input element 318 at a time during which power consumption, power cost, or other conditions are unfavorable for operating the electrical device 102(3), the state indicator(s) 320 may provide an indication of these circumstances. Continuing the example, if a user actuates the manual input element 318, and the current cost of electrical power exceeds a threshold cost, the state indicator 320 may emit red light or blink rapidly to indicate that transitioning the electrical device 102(3) to an operational state is not recommended at the current time or under the current conditions. Additional user input 104, such as actuating the manual input element 318 a second time, may cause the electrical device 102(3) to transition to an operational state.

Figure 4:
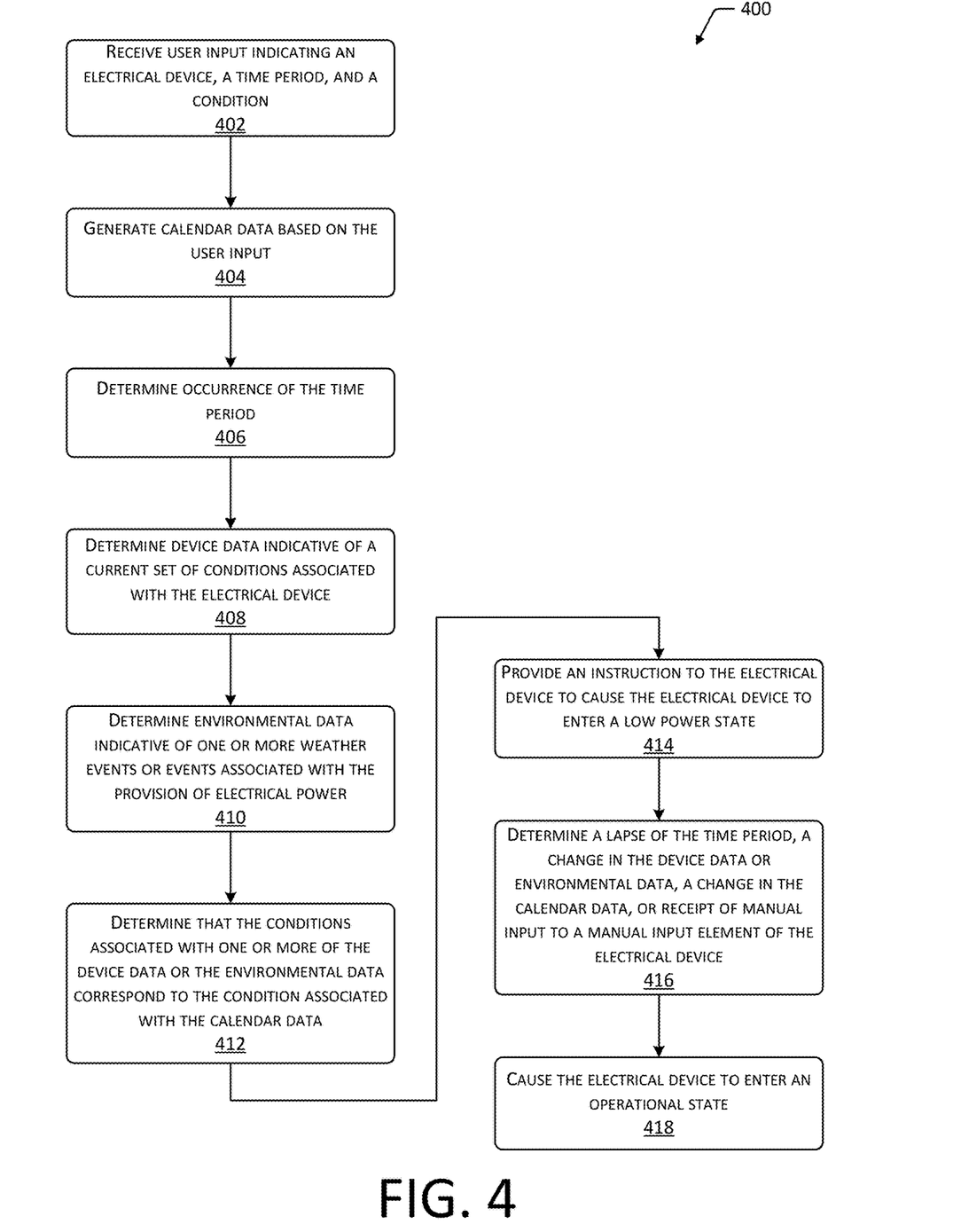
FIG. 4 is a flow diagram illustrating a method for controlling the power state of one or more electrical devices in an environment based on user input.

FIG. 4 is a flow diagram 400 illustrating a method for controlling the power state of one or more electrical devices 102 in an environment based on user input 104. At 402, user input 104 indicating an electrical device 102, a time period, and a condition may be received. For example, a user may access a user interface via a computing device. The computing device may include one of the electrical devices 102 in an environment or a computing device outside of the environment. The user interface may include fields, menus, lists, or other methods by which a user may select, indicate, or input data indicating one or multiple electrical devices 102, time periods, and conditions. In some implementations, a user interface that includes each electrical device 102 detected in an environment may be generated, such as by a power control server 106 or other computing device in communication with at least one electrical device 102 in the environment. In other implementations, a list of electrical devices 102 in an environment may be determined based on user input 104. In some implementations, user input 104 may indicate an individual electrical device 102. In other implementations, user input 104 may indicate multiple electrical devices 102. For example, user input 104 may indicate that every electrical device 102 in a dwelling is to be transitioned to a low power state during certain time periods. As another example, user input 104 may indicate that every electrical device 102 within a single room is to be transitioned to a low power state while other devices are maintained in an operational state. As yet another example, user input 104 may indicate that a particular networked speaker device and four other devices that are controlled using the networked speaker device are to be transitioned to a low power state. Alternatively, user input may indicate that one or more of the devices controlled by the networked speaker device are to be retained in an operational state. In some implementations, the user interface may present one or more notifications or recommendations based on historical use of electrical devices 102 or environmental data 212, such as power data indicative of current quantities of electrical power used or available, the current value of a unit of electrical power, or weather data indicative of a current weather condition. For example, a recommendation may indicate that a particular electrical device 102 is not normally used between the hours of 12:00 P.M. and 12:00 A.M. and suggest that the electrical device 102 be transitioned to a low power state during those hours. As another example, a notification may indicate that due to a current outdoor temperature of 102 degrees Fahrenheit, the price associated with a unit of electrical power has increased above a threshold amount. The notification may indicate a quantity of electrical power or a financial cost that may be conserved by placing particular electrical devices 102 in a low power state during particular time periods.

At 404, calendar data 110 may be generated based on the user input 104. As described with regard to FIG. 2, calendar data 110 may associate an electrical device 102 with a time period and in some implementations, one or more conditions. A time period may include a recurring time period, such as the hours of 2:00 P.M. to 4:00 P.M. daily, or every weekday. In other cases, a time period may include particular days or dates, such as every Saturday, or every year on March 14. In still other cases, a time period may indicate specific days or events, such as Thanksgiving. Conditions may include characteristics of an electrical device 102, such as its state of use, the charge state of a battery or other power source, its location, and so forth. Conditions may also include characteristics of other electrical devices 102 in the environment. For example, a security system may be prevented from entering a low power state if another device in the environment detects movement. Conditions may also include use or activity of an electrical device 102 or proximity data indicating the presence or movement of users within a portion of the environment. Conditions may additionally include factors external to the environment, such as a temperature, precipitation, or another weather condition, or an event associated with provision of power to electrical devices 102, such as an outage, brown out, or value associated with a unit of electrical power. In some implementations, conditions may be detected by sensors associated with an electrical device 102 within the environment. In other implementations, conditions may be determined based on environmental data 212 received from a device external to the environment.

At 406, occurrence of the time period indicated in the calendar data 110 may be determined. For example, one or more clocks 118 or similar modules may generate time data 116 indicative of a current time or the passage of a quantity of time. Based on the time data 116, occurrence of a time period associated with the calendar data 110 may be determined. For example, time data 116 indicative of a current time may correspond to a time period indicated in the calendar data 110 within a threshold tolerance.

At 408, device data 208 indicative of a current set of conditions associated with the electrical device 102 may be determined. Device data 208 may indicate a state of use of the electrical device 102, a location of the electrical device 102, and so forth. In some implementations, device data 208 may indicate data detected using sensors or input devices associated with the electrical device 102, such as detected motion or proximity of users, a determined temperature, detected activity of other devices, and so forth.

At 410, environmental data 212 indicative of one or more weather events or events associated with provision of electrical power may be determined. For example, environmental data 212 may include temperatures or indications of inclement weather or other weather events determined by weather stations or similar entities. As another example, environmental data 212 may include data associated with the provision of electrical power determined from a provider or distributor of electrical power, such as a quantity of electrical power consumption by a user, environment, or region, a quantity of available electrical power for a region, a current cost per unit of electrical power, or an electrical event, such as a power outage or brown-out.

At 412, a determination may be made that the conditions associated with one or more of the device data 208 or the environmental data 212 correspond to the condition associated with the calendar data 110. In some implementations, correspondence between the device data 208 or environmental data 212 and the calendar data 110 may include matching of one or more conditions. For example, a condition associated with the calendar data 110 may indicate that a display associated with the electrical device 102 has not generated output within the past 30 minutes, and the device data 208 may indicate that the display has not been used within that length of time. In other cases, correspondence between the device data 208 and the calendar data 110 may include matching within a threshold tolerance. For example, a condition associated with the calendar data 110 may indicate an outdoor temperature of 95 degrees Fahrenheit or greater. However, if the environmental data 212 indicates a temperature that is within a five-degree tolerance of the condition indicated in the calendar data 110, the electrical device 102 may be transitioned to a low power state.

At 414, in response to occurrence of the time period and the corresponding condition indicated in the device data 208, an instruction may be provided to the electrical device 102 to cause the electrical device 102 to enter a low power state. As described with regard to FIGS. 1-3, a power state instruction 114 may be provided to the electrical device 102, either directly from a device that controls the power state of the electrical device 102, or indirectly through another device in wired or wireless communication with the electrical device 102. When the electrical device 102 enters the low power state, the electrical device 102 may cease use of operational state components 302 of the device and begin using low power state components 312. For example, when in the low power state, the electrical device 102 may no longer be operable to exchange data with devices outside of the environment, I/O devices 308 associated with the electrical device 102 may be inactive, and so forth. Continuing the example, when in the low power state, the electrical device 102 may use a microcontroller 314 to determine passage of time and to detect actuation of a manual input element 318 by a user, but other components of the electrical device 102 may remain inactive to conserve electrical power.

At 416, a lapse of the time period, a change in the device data 208 or environmental data 212, a change in the calendar data 110, or receipt of manual input to a manual input element 318 of the electrical device 102 may be determined. For example, based on data from one or more clocks 118, a microcontroller 314 of the electrical device 102 may determine that the time period indicated in the calendar data 110 has lapsed. As another example, the electrical device 102 may be configured to transition to the operational state periodically, such as once every thirty minutes. While in the operational state, the electrical device 102 may provide a request to, or receive data from, the power control server(s) 106. For example, the power control server(s) 106 may determine the calendar data 110, device data 208, environmental data 212, or other data indicative of a current set of conditions and may provide a power state instruction 114 to the electrical device 102 to return to the low power state or remain in the operational state. Continuing the example, if the calendar data 110 has been modified or if one or more conditions have changed, the electrical device 102 may remain in the operational state if the current conditions or current time no longer correspond to the calendar data 110. If the calendar data 110 is determined to correspond to the current time and conditions, the electrical device 102 may be returned to the low power state. In some implementations, if no power state instruction 114 is received by the electrical device 102 while in the operational state, the electrical device 102 may perform a default action, such as returning to the low power state. In other implementations, a default action may include remaining in the operational state.

At 418, in response to the determination of block 416, the electrical device 102 may be returned to an operational state. For example, in response to manual input using a manual input element 318, the lapse of the time period indicated in the calendar data 110, or a change in the calendar data 110 or one or more current conditions may cause the electrical device 102 to transition to the operational state.

Figure 5:
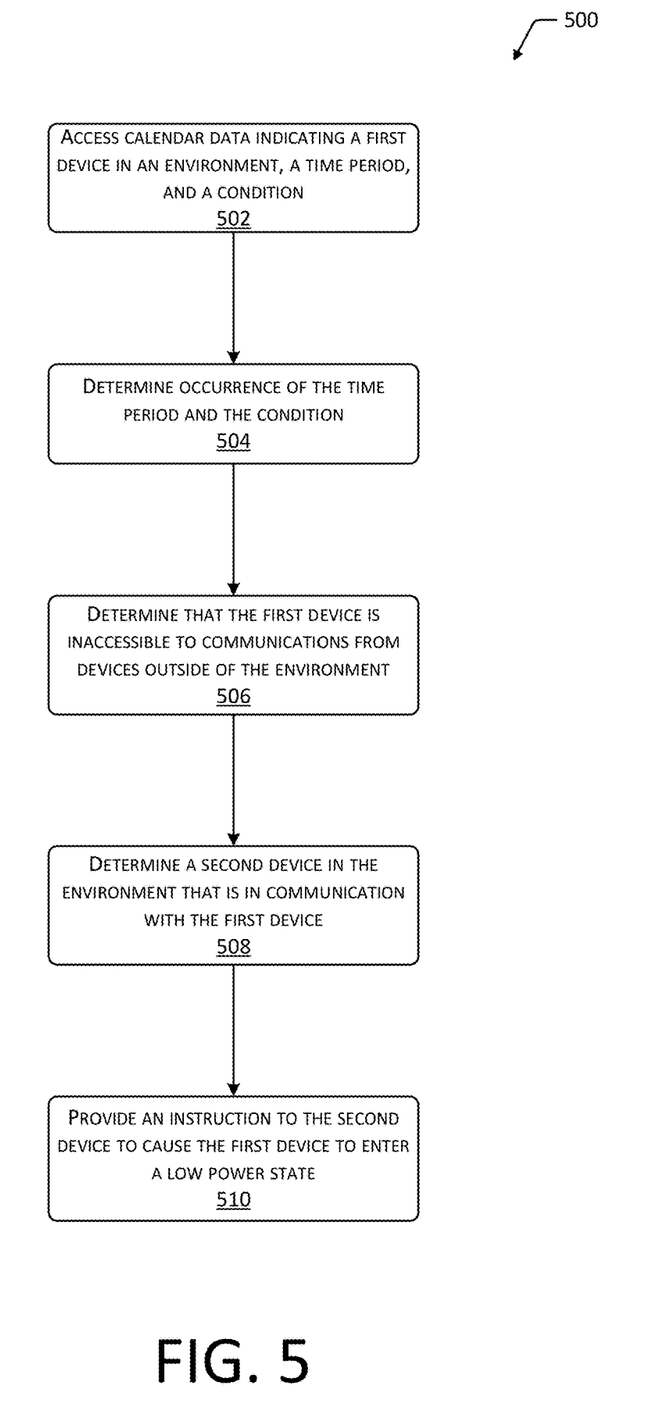
FIG. 5 is a flow diagram illustrating a method for controlling the power state of an electrical device not accessible to devices outside of the environment.

FIG. 5 is a flow diagram 500 illustrating a method for controlling the power state of an electrical device 102 not accessible to devices outside of the environment. At 502, calendar data 110 indicating a first device in an environment, a time period, and a condition may be accessed. As discussed previously, calendar data 110 may associate electrical devices 102 with corresponding time periods and in some implementations, other conditions under which an electrical device 102 is to be transitioned to a low power state.

At 504, occurrence of the time period and the condition may be determined. For example, time data 116 from one or more clocks 118 or other modules may be used to determine a current time or a quantity of elapsed time. Device data 208 or environmental data 212 from one or more of the electrical devices 102 or other devices within or external to the environment may be used to determine current conditions associated with an electrical device 102, ambient weather, the provision of power to the electrical device 102, and so forth.

At 506, a determination may be made that the first device is inaccessible to communications from devices outside of the environment. For example, an electrical device 102 may lack a communication link with a wireless access point 204 and as such, may not be configured to receive power state instructions 114 from power control servers 106 or other devices external to the environment. However, the electrical device 102 may be in communication with other devices in the environment, such as via local networks, near field communication, wired connections 206, and so forth. As such, at 508, a second device in the environment that is in communication with the first device may be determined.

At 510, an instruction may be provided to the second device to cause the first device to enter a low power state. For example, a power state instruction 114 may be provided to an electrical device 102 that communicates with another electrical device 102, such as via a local network or wired connection 206, and the electrical device 102 receiving the power state instruction 114 may provide the power state instruction 114 to one or more other electrical devices 102. In some implementations, a single power state instruction 114 may be used to cause multiple electrical devices 102 to transition to a low power state. In other implementations, a single power state instruction 114 may be received by a single electrical device 102 via one or more other electrical devices 102, and used to cause only the single electrical device 102 to transition to the low power state.

Figure 6:
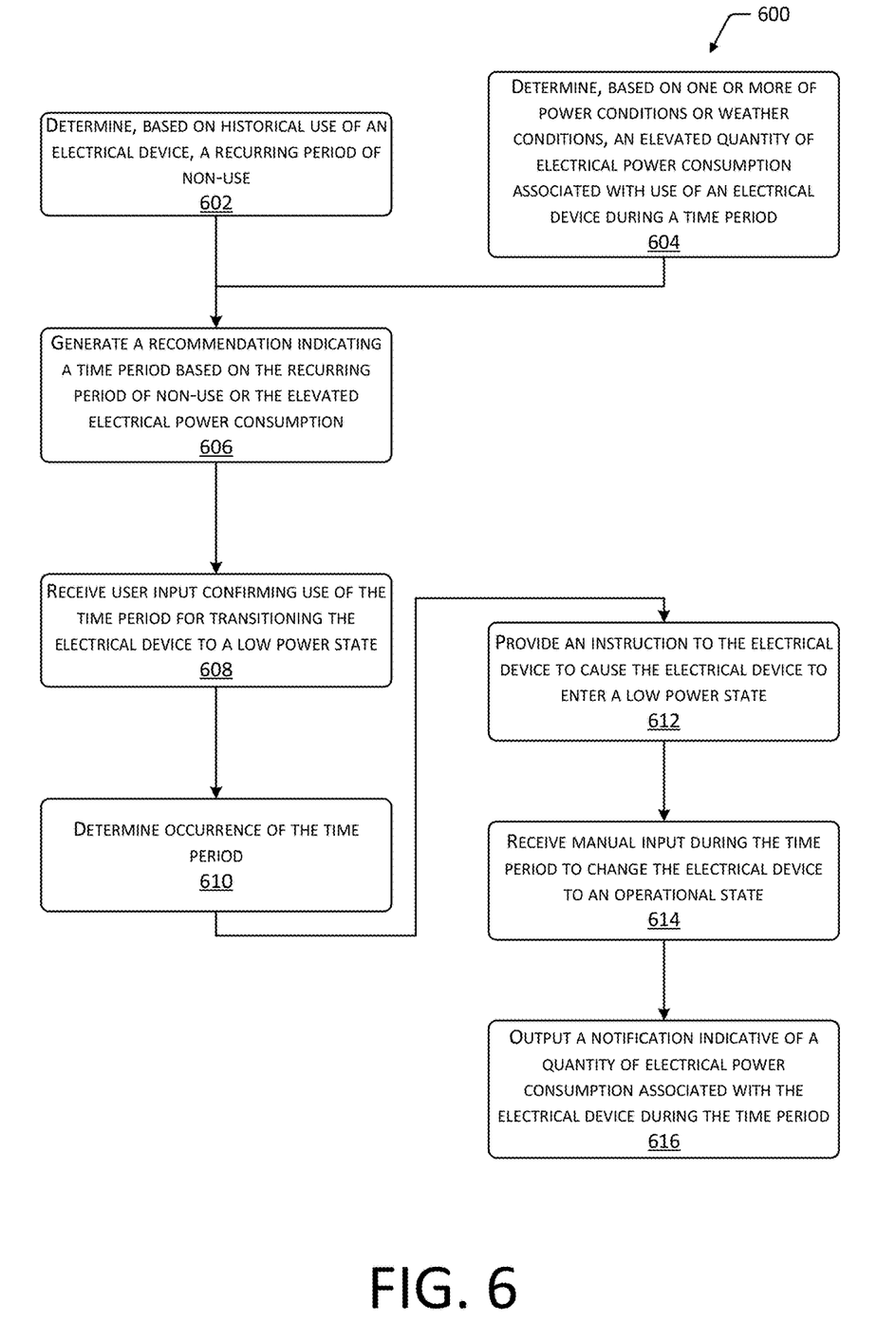
FIG. 6 is a flow diagram illustrating a method for generating power state recommendations based on historical use of electrical power consumption and notifications indicating deviations from recommendations.

FIG. 6 is a flow diagram 600 illustrating a method for generating power state recommendations based on historical use of electrical power consumption and notifications indicating deviations from recommendations. At 602, based on historical use of an electrical device 102, a recurring period of non-use may be determined. For example, a particular electrical device 102, such as a light or a personal computer, may not typically be used between the hours of 10:00 P.M. and 6:00 A.M. while a user is asleep. Machine learning techniques or other methods of analysis may determine periods of non-use for particular electrical devices 102 based on data indicative of historical use.

At 604, based on one or more of power conditions or weather conditions, an elevated quantity of electrical power consumption associated with use of an electrical device 102 during a time period may be determined. For example, during periods of extreme temperature, inclement weather, power outages, increased power demand, increased or decreased power cost, and so forth, quantities of used electrical power and associated costs for the electrical power may change. Data associated with weather, provision of electrical power, and power consumption data for the electrical devices 102 may be used to determine one or more time periods associated with increased cost or electrical power usage.

At 606, a recommendation indicating a time period may be generated based on the recurring period of non-use or the elevated electrical power consumption. In some implementations, one of block 602 or 604 may be performed and the other may be omitted. In other implementations, both block 602 and 604 may be performed and block 606 may include a recommendation of multiple time periods or a single time period associated with both a period of non-use and a period of elevated power consumption.

At 608, user input 104 confirming use of the time period for transitioning the electrical device 102 to a low power state may be received. For example, as described with regard to FIGS. 1 and 2, based on user input 104, calendar data 110 for controlling the power state of the electrical device 102 may be generated, and based on correspondence between current times and conditions, power state instructions 114 may be generated to transition electrical devices 102 to a low power state.

At 610, occurrence of the time period determined at block 606 may be determined. At 612, in response to occurrence of the time period, an instruction may be provided to the electrical device 102 to cause the electrical device 102 to enter a low power state. As described with regard to FIGS. 1-4, a power state instruction 114 may be provided to the electrical device 102, or to another device in communication with the electrical device 102, to cause the electrical device 102 to transition to the low power state.

At 614, manual input may be received during the time period to change the electrical device 102 to an operational state. For example, as described with regard to FIG. 3, an electrical device 102 may include a manual input element 318 configured to receive manual input by a user. A microcontroller 314 that remains active during the low power state may be configured to receive a signal indicating actuation of the manual input element 318.

At 616, in response to the manual input, a notification indicative of a quantity of electrical power consumption associated with the electrical device 102 during the time period may be output. For example, the electrical device 102, the power control server(s) 106, or another device in communication with the electrical device 102 may determine a quantity or cost of electrical power that would be used if the electrical device 102 were returned to an operational state in response to the manual input. A notification indicative of this quantity or cost may be generated and output to a device in the environment. In some cases, a notification may be provided to a device outside of the environment. In some implementations, user input confirming returning the electrical device 102 to the operational state in response to the notification may be solicited. In some cases, the notification may include use of a state indicator 320 associated with the electrical device 102. For example, an LED associated with an electrical device 102 may turn red or blink rapidly when the manual input element 318 is actuated if transitioning the electrical device 102 to an operational state will result in a cost or consumption of electrical power that exceeds a threshold.

Figure 7:
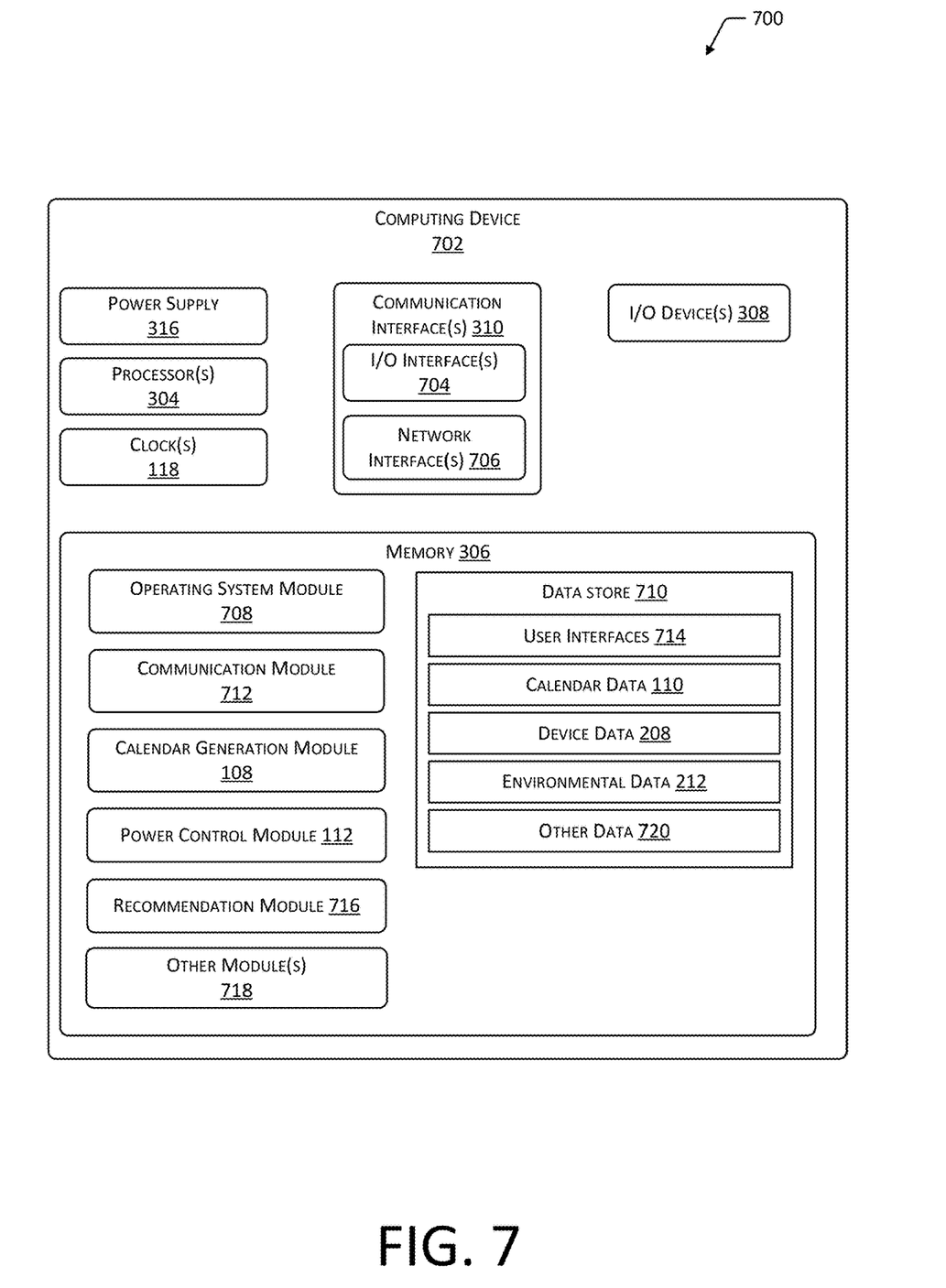
FIG. 7 is a block diagram illustrating a computing device within the present disclosure.

FIG. 7 is a block diagram 700 illustrating a computing device 702 within the present disclosure. In some implementations, the computing device 702 may include one or more power control servers 106. In other implementations, the computing device 702 may include one or more electrical devices 102 or other devices in communication with at least one electrical device 102 in an environment. While FIG. 7 depicts a single block diagram 700 representative of a computing device 702, any number of networked computing devices 702, including a combination of power control servers 106, electrical devices 102, or other computing devices 702, may perform the implementations described herein.

One or more power supplies 316 may be configured to provide electrical power suitable for operating the components of the computing device 702. In some implementations, the power supply 316 may include a rechargeable battery, fuel cell, photovoltaic cell, power conditioning circuitry, and so forth.

The computing device 702 may include one or more hardware processor(s) 304 (processors) configured to execute one or more stored instructions. The processor(s) 304 may include one or more cores. One or more clock(s) 118 may provide information indicative of date, time, ticks, and so forth. For example, the processor(s) 304 may use data from the clock 608 to generate a timestamp, trigger a preprogrammed action, and so forth.

The computing device 702 may include one or more communication interfaces 310, such as input/output (I/O) interfaces 704, network interfaces 706, and so forth. The communication interfaces 310 may enable the computing device 702, or components of the computing device 702, to communicate with other computing devices 702 or components of the other computing devices 702. The I/O interfaces 704 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 704 may couple to one or more I/O devices 308. The I/O devices 308 may include any manner of input device or output device associated with the computing device 702. For example, I/O devices 308 may include touch sensors, keyboards, mouse devices, microphones, image sensors (e.g., cameras), scanners, displays, speakers, haptic devices, printers, NFC devices, and so forth. In some cases, I/O devices 308 may include sensor devices for determining one or more of device data 208 or environmental data 212. For example, an I/O device 308 may include a thermometer, a barometer, a position sensor, a motion sensor, and so forth. In some implementations, the I/O devices 308 may be physically incorporated with the computing device 702 or may be externally placed.

The network interfaces 706 may be configured to provide communications between the computing device 702 and other devices, such as the I/O devices 308, routers, access points 204, and so forth. The network interfaces 706 may include devices configured to couple to one or more networks including local area networks (LANs), wireless LANs (WLANs), wide area networks (WANs), wireless WANs, and so forth. For example, the network interfaces 706 may include devices compatible with Ethernet, Wi-Fi, Bluetooth, ZigBee, Z-Wave, 3G, 4G, LTE, and so forth.

The computing device 702 may include one or more busses or other internal communications hardware or software that allows for the transfer of data between the various modules and components of the computing device 702.

As shown in FIG. 7, the computing device 702 may include one or more memories 306. The memory 306 may include one or more computer-readable storage media (CRSM). The CRSM may be any one or more of an electronic storage medium, a magnetic storage medium, an optical storage medium, a quantum storage medium, a mechanical computer storage medium, and so forth. The memory 306 may provide storage of computer-readable instructions, data structures, program modules, and other data for the operation of the computing device 702. A few example modules are shown stored in the memory 306, although the same functionality may alternatively be implemented in hardware, firmware, or as a system on a chip (SoC).

The memory 306 may include one or more operating system (OS) modules 708. The OS module 708 may be configured to manage hardware resource devices such as the I/O interfaces 704, the network interfaces 706, the I/O devices 308, and to provide various services to applications or modules executing on the processors 304. The OS module 708 may implement a variant of the FreeBSD operating system as promulgated by the FreeBSD Project; UNIX or a UNIX-like operating system; a variation of the Linux operating system as promulgated by Linus Torvalds; the Windows operating system from Microsoft Corporation of Redmond, Wash., USA; or other operating systems.

One or more data stores 710 and one or more of the following modules may also be associated with the memory 306. The modules may be executed as foreground applications, background tasks, daemons, and so forth. The data store(s) 710 may use a flat file, database, linked list, tree, executable code, script, or other data structure to store information. In some implementations, the data store(s) 710 or a portion of the data store(s) 710 may be distributed across one or more other devices including other computing devices 702, network attached storage devices, and so forth.

A communication module 712 may be configured to establish communications with one or more other computing devices 702. Communications may be authenticated, encrypted, and so forth.

The memory 306 may also store the calendar generation module 108. The calendar generation module 108 may receive user input 104 indicative of electrical devices 102, time periods, and in some cases, conditions for transitioning the electrical devices 102 to a low power state. In some implementations, the calendar generation module 108 may provide one or more user interfaces 714 to a computing device 702 and receive user input 104 via the user interface(s) 714. Based on the user input 104, the calendar generation module 108 may generate calendar data 110 that associates electrical devices 102 with corresponding time periods and conditions.

The memory 306 may additionally store the power control module 112. The power control module 112 may determine time data 116 from the clock(s) 118, device data 208 from one or more electrical devices 102 or other devices in communication with the electrical devices 102, and in some cases, environmental data 212 such as weather data or power data indicative of conditions associated with ambient weather or the provision of power to electrical devices 102. The power control module 112 may determine correspondence between the calendar data 110 and the time data 116 to determine occurrence of a time period indicated in the calendar data 110. The power control module 112 may also determine correspondence between one or more of the device data 208, environmental data 212, other data indicative of one or more current conditions, and the calendar data 110, to determine occurrence of one or more conditions indicated in the calendar data 110. Based on correspondence between the calendar data 110 and the time data 116 and data indicative of current conditions, the power control module 112 may generate power state instructions 114 to cause an electrical device 102 to transition to a low power state. In some implementations, the power control module 112 may determine that an electrical device 102 is not configured to receive the power state instruction 114. In such a case, the power control module 112 may determine another device in communication with the electrical device 102 and provide the power state instruction 114 to the other device, which may in turn provide the power state instruction 114 to the electrical device 102.

The memory 306 may further store a recommendation module 716. The recommendation module 716 may determine historical use data for one or more electrical devices 102. The recommendation module 716 may also determine data indicative of ambient weather, the provision of power to electrical devices 102, and so forth, such as quantities of power consumption, costs of a unit of electrical power, extreme temperatures, inclement weather, brown-outs, or power outages. Based on this data, the recommendation module 716 may generate recommendations or notifications indicating time periods and electrical devices 102 that may be transitioned to a low power state to conserve at least a threshold quantity of electrical power or a threshold quantity of value.

Other modules 718 may also be present in the memory 306. For example, encryption modules may be used to encrypt and decrypt communications between computing devices 702. Authentication modules may be used to authenticate communications sent or received by computing devices 702. Other modules 718 may also include modules for detecting characteristics of a computing device 702, such as detecting the presence of electrical devices 102 in an environment and populating a user interface 714 with a list of the electrical devices 102.

Other data 720 within the data store(s) 710 may include configurations, settings, preferences, and default values associated with computing devices 702. Other data 720 may include encryption keys and schema, access credentials, and so forth. Other data 720 may further include data indicative of the hardware or software components or other capabilities of electrical devices 102, sensor data determined by electrical devices 102, current and historical use data for electrical devices 102, methods by which electrical devices 102 communicate with one another, and so forth.

In different implementations, different computing devices 702 may have different capabilities or capacities. For example, power control servers 106 may have greater processing capabilities or data storage capacity than electrical devices 102.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
   one or more memories storing computer-executable instructions; and
   one or more hardware processors to execute the computer-executable instructions to:
   provide a user interface to a user device, wherein the user interface is configured to receive user input that associates devices with corresponding time periods and conditions;
   receive, via the user interface, first user input indicating a first device in an environment, a first time period, and a first set of conditions for causing the first device to enter a low power state, wherein the first set of conditions includes one or more of a value associated with a unit of electrical power, a weather condition, or an event associated with provision of electrical power to the first device;
   determine occurrence of the first time period;
   determine device data from one or more of the first device or a second device in the environment;
   determine, based on the device data, a second set of conditions;
   determine correspondence between the first set of conditions and the second set of conditions; and
   at a first time, provide a first instruction to the first device from a device outside of the environment to cause the first device to:
   enter the low power state, wherein when in the low power state, the first device is inaccessible to communications from devices outside of the environment until a lapse of the first time period or receipt of manual input to the first device;
   at a second time subsequent to the first time and prior to the lapse of the first time period, enter an operational state;
   determine a third set of conditions at the second time; and
   based on correspondence between the third set of conditions and the first set of conditions, one or more of: enter the low power state or remain in the operational state.

2. The system of claim 1, further comprising computer-executable instructions to:
   determine that the first device is inaccessible to communications from devices outside of the environment;
   determine a second device that is in communication with the first device, wherein the device data is determined from the second device; and
   provide the first instruction to the second device to cause the second device to provide the first instruction to the first device.

3. The system of claim 1, further comprising computer-executable instructions to:
   receive second user input during the first time period to change the first device from the low power state to an operational state;
   generate a notification indicative of the correspondence between the first set of conditions and the second set of conditions; and
   provide the notification to one or more of the first device, the second device, a third device in the environment, or a fourth device outside of the environment.

4. The system of claim 1, further comprising computer-executable instructions to:
   determine a quantity of electrical power associated with maintaining the first device in the low power state;
   generate a notification indicative of the quantity of electrical power; and
   provide the notification to one or more of the first device, the second device, a third device in the environment, or a fourth device outside of the environment.

5. A method comprising:
   receiving first user input indicating a first device in an environment and a first condition;
   determining occurrence of the first condition; and causing a first instruction to be provided from a device outside of the environment to the first device to cause the first device to:
at a first time, enter a low power state, wherein the first device is inaccessible to devices outside of the environment when in the low power state until a lapse of a first time period;
enter an operational state at a second time subsequent to the first time and prior to the lapse of the first time period;
determine a second condition at the second time; and
based on correspondence between the second condition and the first condition, one or more of: enter the low power state or remain in the operational state.

6. The method of claim 5, further comprising:
receiving second user input that indicates a third condition for causing the first device to enter the low power state, wherein the first instruction further causes the first device to:
determine a difference between the third condition and the second condition; and
remain in the operational state in response to the difference between the third condition and the second condition.

7. The method of claim 5, further comprising:
determining environmental data from a device outside of the environment; and
determining, based on the environmental data, one or more of: a quantity of electrical power consumption, a weather event, or an event associated with provision of electrical power to the first device, wherein one or more of the first condition or the second condition includes the one or more of the quantity of electrical power consumption, the weather event, or the event associated with the provision of electrical power to the first device.

8. The method of claim 5, further comprising:
receiving second user input to cause the first device to change from the low power state to the operational state;
determining a quantity of electrical power consumption associated with the operational state of the first device;
generating a notification indicative of the quantity of electrical power consumption; and
providing the notification to one or more of the first device, a second device in the environment, or a third device outside of the environment.

9. The method of claim 5, further comprising:
determining a second device in communication with the first device; and
causing the second device to provide the first instruction to the first device to cause the first device to enter the low power state.

10. The method of claim 9, wherein the first user input further indicates the second device, the method further comprising:
causing the second device to enter the low power state in response to the occurrence of the first condition.

11. The method of claim 5, further comprising:
determining proximity data indicative of one or more users within a portion of the environment; and
determining, based on correspondence between the proximity data and threshold data, that a count of users within the portion of the environment is less than a threshold count, wherein the first device is caused to enter the low power state in response to the proximity data.

12. The method of claim 5, further comprising:
determining activity data indicative of use of one or more of the first device or a second device in communication with the first device; and
determining, based on correspondence between the activity data and threshold data, that use of the one or more of the first device or the second device is less than a threshold quantity of use, wherein the first device is caused to enter the low power state in response to the activity data.

13. A system comprising:
one or more memories storing computer-executable instructions; and
one or more hardware processors to execute the computer-executable instructions to:
access data indicating a first device in an environment and a first condition associated with the first device;
determine occurrence of the first condition; and
in response to the occurrence of the first condition, cause a first instruction to be provided from a device outside of the environment to the first device to cause the first device to:
at a first time, enter a low power state, wherein the first device is inaccessible to devices outside of the environment when in the low power state;
enter an operational state at a second time subsequent to the first time;
determine a second condition at the second time; and
based on correspondence between the second condition and the first condition, one or more of: enter the low power state or remain in the operational state.

14. The system of claim 13, further comprising computer-executable instructions to:
receive user input indicating a third condition for causing the first device to enter the low power state, wherein the first instruction further causes the first device to:
determine a difference between the third condition and the second condition; and
remain in the operational state in response to the difference.

15. The system of claim 13, further comprising computer-executable instructions to:
determine a second device in communication with the first device, wherein the computer-executable instructions to cause the first instruction to be provided to the first device include computer-executable instructions to cause the second device to provide the first instruction to the first device to cause the first device to enter the low power state.

16. The system of claim 13, further comprising computer-executable instructions to:
determine activity data indicative of use of the first device; and
determine, based on correspondence between the activity data and threshold data, that a quantity of use of the first device is less than a threshold quantity, wherein the first instruction is provided to the first device further in response to the activity data.

17. The system of claim 13, further comprising computer-executable instructions to:
determine proximity data indicative of users proximate to the first device; and
determine, based on correspondence between the proximity data and threshold data, that a count of users proximate to the first device is less than a threshold count, wherein the first instruction is provided to the first device further in response to the proximity data.

18. The system of claim 13, further comprising computer-executable instructions to:
   determine a change in a quantity of electrical power used by the first device;
   generate a notification indicative of the change; and
   provide the notification to one or more of the first device, a second device in the environment, or a third device outside of the environment.

19. The system of claim 13, further comprising computer-executable instructions to:
   receive user input to change the first device to the operational state;
   in response to the user input, change the first device from the low power state to the operational state;
   determine a quantity of electrical power consumption of the first device during the low power state;
   generate a notification indicative of the quantity of electrical power consumption; and
   in response to the user input, provide the notification to one or more of the first device, a second device in the environment, or a third device outside of the environment.

20. The system of claim 13, wherein the first instruction further causes the first device to:
   in response to a difference between the first condition and the second condition at the second time, remain in the operational state; and
   in response to the second condition matching the first condition, enter the low power state.

* * * * *